Dec. 6, 1938. C. O. HOOVER Re. 20,938

PROCESS FOR PURIFYING HYDROCARBON OILS

Original Filed Aug. 10, 1935 2 Sheets-Sheet 1

INVENTOR
BY Charles O. Hoover
William C. Linton
ATTORNEY

Dec. 6, 1938. C. O. HOOVER Re. 20,938

PROCESS FOR PURIFYING HYDROCARBON OILS

Original Filed Aug. 10, 1935 2 Sheets-Sheet 2

INVENTOR
Charles O. Hoover,
BY
William C. Sutton.
ATTORNEY

Reissued Dec. 6, 1938

Re. 20,938

UNITED STATES PATENT OFFICE 20,938

PROCESS FOR PURIFYING HYDROCARBON OILS

Charles O. Hoover, Houston, Tex., assignor to Bennett-Clark Co., Inc., San Antonio, Tex., a corporation of Texas Original No. 2,042,050, dated May 26, 1936, Serial No. 35,652, August 10, 1935. Application for reissue May 25, 1938, Serial No. 209,967. In Canada May 4, 1935

30 Claims. (Cl. 196—29)

Figure 1:
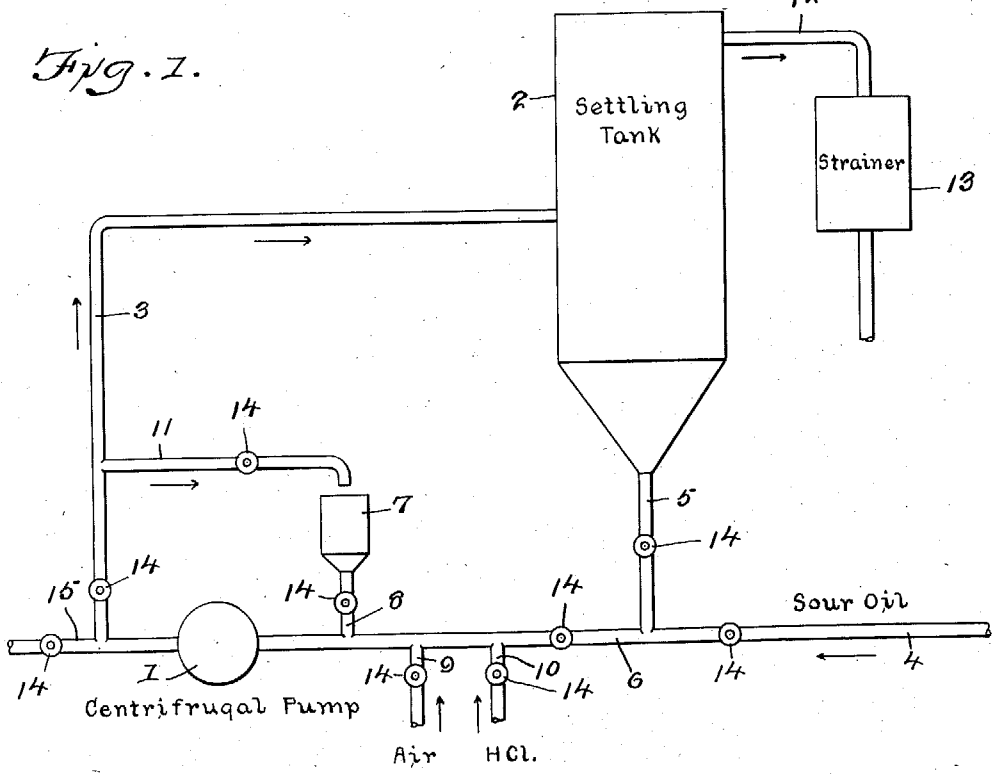

The present invention relates to a process for the treatment of hydrocarbon or mineral oils and particularly to the treatment of the relatively light hydrocarbon or mineral oils known as naphthas, gasoline, kerosene, water whites, raffinate, and the like, for removing or altering "sour compounds", namely compounds which contain sulphur, especially the organic compounds known as mercaptans as well as organic compounds which may have been formed in the oil by treatment with sulphuric acid or sulphur dioxide or other acid compounds containing sulphur.

The process is especially useful in the case of treating naphthas, raffinate, gasoline and kerosene and similar like fractions containing sulphur compounds existing in said oils in the form of organic sulphur compounds and is especially useful in treating naphthas, raffinate, gasoline, kerosene and similar products containing organic sulphur compounds in the form of mercaptans, although the process is also applicable to the treatment of hydrocarbon oils generally which contain said sulphur compounds.

In general, the present invention relates to process for sweetening sour hydrocarbon oils.

An object of the present invention is to provide a process by which the sour compounds in sour oils or distillates may be removed or altered, or converted into compounds which are not sour, thus rendering the sour oils or distillates sweet, and in which process, if desired the agent or agents (other than oxygen) employed to sweeten the sour oils or distillates may be reactivated or regenerated concurrently with their use in the sweetening of the sour oils or distillates, whereby the sweetening of the sour oils or distillates and the maintenance of the activity of said agent or agents may be effected at the same time.

A further object of the invention is the provision of a process by which sour oils may be sweetened without the use of the so called "doctor solution", that is an aqueous solution of sodium plumbite, and also without the use of aqueous solutions of salts of metals forming insoluble sulphides with hydrogen sulphide, such as aqueous solutions of cupric chloride or other cupric salts.

Oils treated in accordance with the process of the present invention are not only doctor sweet after treatment, but the oils also after treatment by the process of the present invention frequently show a lowered gum content or pass a more satisfactory corrosion test or both. In many instances also the color and stability of the color of the oil treated is improved.

The removal of mercaptans from oils of the character described by the use of doctor solution, or aqueous sodium plumbite solution, is well understood in the art and the removal is accomplished by intimately contacting the aqueous sodium plumbite or doctor solution with the oil to be sweetened or from which the mercaptans are to be removed. The sodium plumbite reacts with the mercaptans to produce lead mercaptides and these are in turn decomposed by elemental sulphur added to the oil treated either before, after or during the treatment with the doctor or sodium plumbite solution. The elemental sulphur reacts with the lead mercaptides and produces organic disulphides and lead sulphide. The actual number of grams or pounds of sulphur in the oil combined in the form of mercaptans is not reduced by the treatment with the doctor or plumbite solution, but it is changed into a form that is not sour and relatively stable; that is, if R represents the organic radicals of the mercaptans, the change is from two molecules of mercaptans, 2RSH, to one molecule of disulphide, R—S—S—R. The plumbite or doctor solution process of treating sour oils is objectionable in many respects requiring sulphur, large quantities of litharge and caustic alkali for the production of the aqueous sodium plumbite solution and is considerably expensive, since the lead of the lead sulphide is lost unless it is recovered by smelting operations or converted into sulphate or oxide by some suitable process. The recovery of the lead in available form for reuse is not generally done by refiners, and many refiners, on account of the cost of recovering the lead in available form from the lead sulphide, find it more advantageous to purchase fresh litharge and discard the lead sulphide or sell it for whatever can be obtained for it.

The plumbite treatment is further objectionable in that oils which before treatment exhibited a satisfactory corrosion test are likely after treatment to exhibit an unsatisfactory corrosion test, and the oils treated usually have their total sulphur content increased. A still further objection of the plumbite treatment of sour oils is the fact that the insoluble lead sulphide formed in the oil as the result of the treatment sometimes settles from the oil very slowly, and difficulty is frequently experienced in separating the insoluble lead sulphide from the sweetened oil.

Sour oils of the character described above when sweetened with aqueous doctor solution or with water solutions of salts of metals forming insoluble sulphides with hydrogen sulphide, as for example a water solution of cupric chloride, when rerun, that is when they are redistilled, produce distillates which are sour to the "doctor test" notwithstanding that the oils have been sweetened before distillation by intimate contact with aqueous doctor solution or water solutions of said salts. This is an objection which is overcome by the process of the present invention, since oils treated in accordance with the present invention upon being rerun or redistilled yield distillates which are usually, if not always, sweet to the "doctor test".

A further object of the present invention is the provision of a process by which sour oils can be treated and sweetened at a very rapid rate and at a very nominal cost, as the agent or agents (other than oxygen) used in accomplishing the sweetening action may be regenerated for continued use, and the oils can be sweetened while flowing at a rapid rate through the equipment used.

A further object of the present invention is to provide a sweetening process which includes reactivating or regenerating materials or compounds after they have been used therein to sweeten sour hydrocarbon oils and distillates.

A further object of the invention is the sweetening of sour hydrocarbon oils by a process in which the reagents employed, other than the oxygen-containing gas, are in solid form, thereby avoiding the objectionable corrosion of the equipment and the formation of suspension in the oils undergoing treatment, which often occur where the reagents for sweetening the oils are employed in the form of aqueous or other solutions or suspensions.

According to the present invention mineral or hydrocarbon oils, for example gasoline, naphthas, raffinate, water whites, furnace oils, Diesel engine oils, transformer oils, kerosene, or heavier oils than these, containing mercaptans or other sour constituents, which are to be sweetened, are brought in intimate contact with a compound of a metal in solid form which, even at atmospheric temperatures, will enable the sour oil to be sweetened, which metal compound has the further property of being able to be revivified or regenerated, for repeated use in enabling the sweetening of sour oils by contacting it with oxygen or an oxygen containing gas, for example a compound of a metal which may be reduced from a higher to a lower valency. This intimate contact is preferably accomplished in the presence of a solid adsorbent material, for example, clay of a highly adsorbent character, such as fuller's earth or bentonite or like clays, or in the presence of other material having adsorbent properties such as alumina, or activated alumina. Examples of specific metal compounds which may be employed are cupric oxide, cupric hydroxide, cupric chloride, cupric nitrate, basic cupric carbonate, mercuric chloride, ferric chloride, ferric sulphate etc. Iron compounds usually give objectionable colorations to oils containing a high proportion of unsaturated hydrocarbon compounds and for that reason would not be used in treating such oils when an uncolored product is desired. Cupric chloride may advantageously be used in treating naphthas, raffinate or gasoline or other oils containing high proportions of unsaturated hydrocarbon compounds. In addition to the adsorbent and metal compound an oxidizing agent may be associated therewith such as alkali permanganates, as potassium permanganate or manganates, manganese dioxide or other oxidizing agent. According to the present preferred mode of practicing my invention the metal compounds, such as cupric oxide, cupric hydroxide, cupric chloride, cupric nitrate, basic cupric carbonate, mercuric chloride, ferric chloride or ferric sulphate etc. are kept active or regenerated by intimately mixing with the naphtha or gasoline, or other oil to be treated, air or oxygen, or an oxygen containing gas or an oxidizing agent either solid or liquid capable of oxidizing the metal in the metal compounds from the lower to a higher valency, but I do not limit myself to this specific manner of accomplishing the said regeneration, as other modes of accomplishing the regeneration are within my invention, as more fully set forth below.

Very satisfactory results may be obtained by utilizing a mixture comprising from 70 to 98 per cent clay with from 30% down to 2%, and even less, of metal compound as for example cupric chloride. An oxidizing agent may be mixed into the mixture of clay and metal compound to the extent of about 2–15%, for example 5% of potassium permanganate. When the form of apparatus shown in Figure 1 of the accompanying drawings (which is hereinafter more particularly described) is used to practice the invention, the reagents in the mixture, including the clay or other adsorbent, preferably should be in a fine state of division, preferably completely passing through a 100 mesh screen and most of it passing through a 200 mesh screen. However, when the form of apparatus shown in Figure 2 of the accompanying drawings (which is hereinafter more particularly described) is used to practice the invention, the metal compounds and clay or other adsorbent may be used in a very much coarser state of division, for example of 10 to 20 mesh screen size and even larger. Very satisfactory results are produced by using a reagent mixture containing 90% of dry clay, 5% of cupric chloride and 5% of potassium permanganate. A satisfactory mixture also consists of 95% dry clay and 5% solid cupric chloride. The mixtures of adsorbent material and metal compound, or mixtures of adsorbent material, metal compound and oxidizing agent are used in a dry or substantially dry condition, such as may be obtained by mixing the divided dry adsorbent material and the divided dry metal compounds of the kind indicated above, or by mixing the divided dry adsorbent material, the divided dry metal compounds and the divided dry oxidizing agent. The mixture of metal compounds and adsorbent materials may also be prepared by impregnating the adsorbent material with a solution of the metal compound or compounds and thereafter evaporating the solvent of said solution. For instance, the adsorbent material may be impregnated with a water solution of cupric chloride to the extent necessary to produce the proportion of cupric chloride in the adsorbent desired, and thereafter the so impregnated adsorbent material dried to evaporate the water of solution, but leaving preferably the water of crystallization in the solid cupric chloride resulting from the evaporation of the water; or the adsorbent material may be impregnated with a solution of cupric chloride in methyl alcohol and the so impregnated adsorbent treated to evaporate the methyl alcohol so as to produce an adsorbent impregnated with solid cupric chloride. When the metal compounds are used without addition of adsorbent material or oxidizing compounds, the said metal compounds are used also in dry condition. Water of crystallization in the metal compounds or oxidizing compounds is not objectionable. The presence of a slight amount of water is not particularly disadvantageous, but the amount of water should not reach such an extent as to form an independent solution phase separable or flowable as such from the adsorbent material, or as to form an aqueous muddy mass with the clay or other adsorbent. Practical limits to which water may be present in the practice of the process are considered below. Thus, in the beginning of the practice of the invention the metal compounds are present in association with the clay or other adsorbent in the solid and substantially dry condition and the clay or other adsorbent is also substantially dry, but the water moisture content of the metal compound and/or clay or other adsorbent may rise considerably above absolutly anhydrous conditions, or air dry conditions, without impairing the operation of the process, and for example, the water moisture content of the solid mixture of metal compound and adsorbent material may rise to 15 to 25 per cent or more, depending, more or less upon the nature of the adsorbent material and its state of division.

According to one manner of practicing the invention, and utilizing clay as an example of the adsorbent material used, the metal compound or mixture of metal compound and clay, with or without added oxidizing agent, may be agitated in any suitable way with the "sour" oil, naphthas or gasoline etc., and air or oxygen intimately contacted with the mass being agitated. After agitation of the naphthas, gasoline or kerosene etc., in presence of air or oxygen and the metal compounds or metal compounds and clay, the metal compounds and clay are allowed to settle from the sweetened naphthas, gasoline or kerosene, etc., and the said settled metal compounds, or metal compounds together with the clay associated therewith, are again agitated with another quantity of "sour" naphtha, gasoline or kerosene, etc., in the presence of air or oxygen to produce sweetening of the oils.

In carrying out the use and re-use of reagents in this modification of the invention, the reagents, sour naphthas, gasoline or kerosene, etc., and air, or oxygen, may be fed to the inlet of a centrifugal pump which will produce the necessary agitation of the oils, reagents and air or oxygen. The oil will be substantially completely sweetened on passing through the centrifugal pump. The mixture may then be led to a point about midway of the height of a tall tank where the reagents and clay will settle from the sweet naphthas, gasoline or kerosene etc. The reagents and clay with some oil may be aspirated from the bottom of the tank by the centrifugal pump and fed with further quantities of sour naphthas, gasoline or kerosene etc., and air or oxygen to the inlet of the centrifugal pump and the mixture produced by the pump discharge into the tank as above described. Sweet oil will accumulate in the upper portion of the tank free of metal compound and clay, and may be drawn off continuously or intermittently. The centrifugal pump may be operated intermittently or continuously in its aspiration of reagent and clay from the tank and in its mixing of the reagents and air or oxygen with the sour oil and discharging of the mixture into the tank.

I have found it advantageous, in some instances, to add a small amount of an acid to the oil undergoing treatment. The acid is preferably one which contains the negative radical of the metal compound. Thus in the case of cupric chloride it would be hydrochloric acid, in the case of cupric nitrate it would be nitric acid, and sulphuric acid for sulphates. This addition of acid in many cases increases the degree and rate of regeneration. This additional acid is required in those cases where on account of the acidic character of the salt or metal compound in the presence of water or moisture, acid is removed by reaction with basic constituents of the clay or adsorbent employed or adsorbed as acid by the clay or other absorbent. As understood by the person skilled in the art, the amount of acid to be added will depend upon a number of factors including the character of the clay or other adsorbent and the degree of hydrolysis of the salt, all of which may be readily ascertainable, if not by computation, then by trial.

Figure 2:
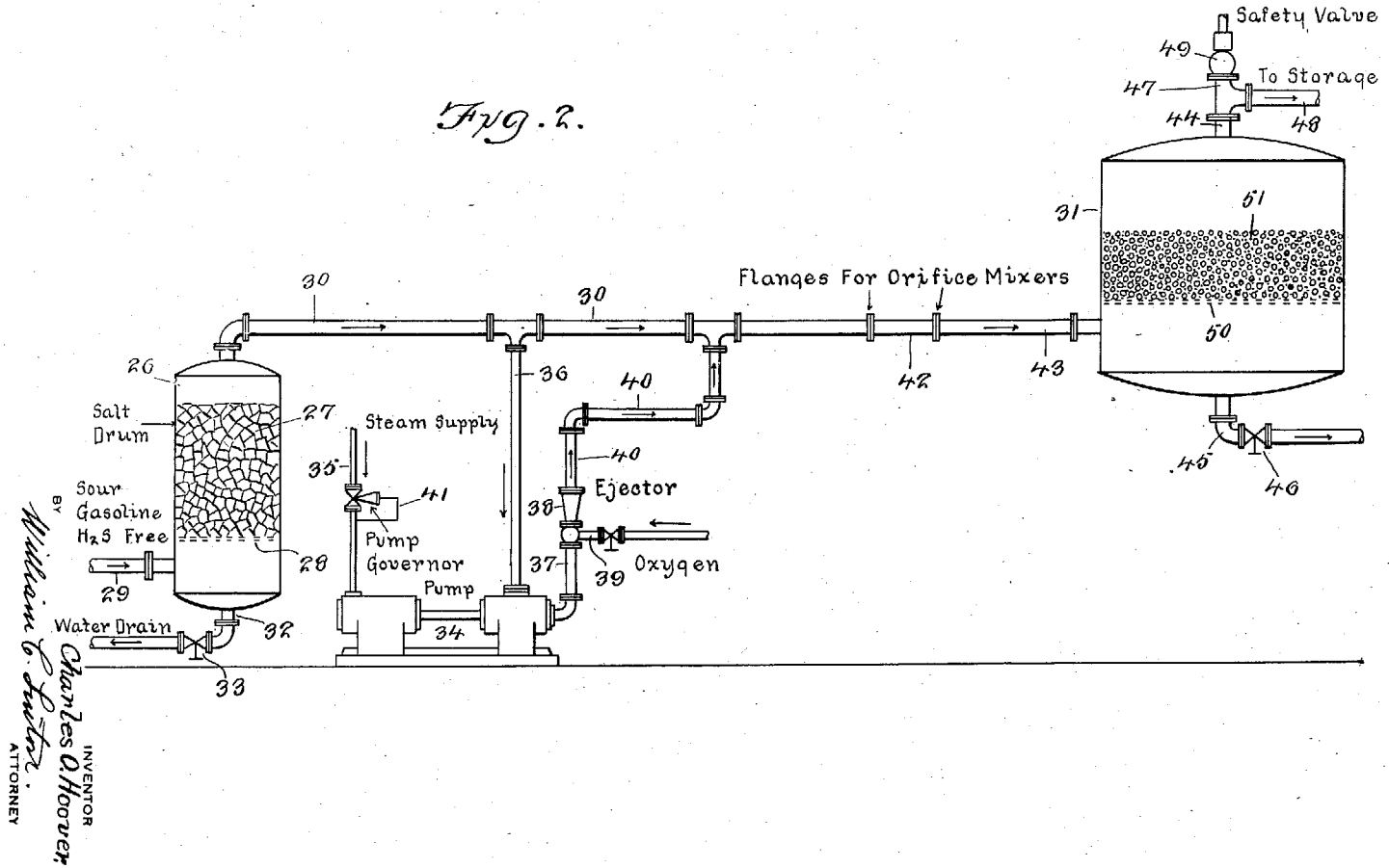

The drawings accompanying the present application show schematically two forms of apparatus suitable for use in practicing the invention, Figure 1 showing one form of apparatus, and Figure 2 another form of apparatus.

Referring to Figure 1 of the drawings the numeral 1 indicates a centrifugal pump. The numeral 2 indicates a settling tank. The discharge end of the centrifugal pump 1 is connected with the settling tank 2 by means of a pipe 3, the pipe 3 discharging into the tank 2 about midway of its height. The numeral 4 indicates a line from which the sour oil to be treated is taken. The tank 2 is conically shaped at its bottom and discharges from its bottom into a pipe 5 which connects with a pipe 6 which leads to the inlet side of the centrifugal pump 1, the pipe 6 forming a continuation of the pipe 4. A hopper 7 is connected by means of a pipe 8 to the pipe 6 for introducing into the pipe 6 the metal compound or adsorbent and metal compound mixtures described above. A pipe 9 connects with the pipe 6 for introducing air or oxygen into the pipe 6 leading to the inlet of the centrifugal pump 1. The air or oxygen is preferably dry. Hydrochloric acid, preferably as dry hydrochloric acid gas, when it is desired to use the same, is introduced into the pipe 6 by means of the pipe 10. A pipe 11 may be connected with the pipe 3 to discharge oil into the hopper 7 to facilitate the discharge of absorbent and reagent from the hopper 7 into the pipe 6. To the upper end of the tank 2, or near its upper end, is connected a discharge pipe 12 for the treated product. A strainer or filter 13 may be connected with the discharge pipe 12 to remove any entrained metal compound, adsorbent or suspended matter in the oil treated. This strainer is not usually necessary, since if the outlet of the tank 2 for the pipe 12 is sufficiently high above the discharge point of the pipe 3 into the tank and if the discharge outlet of the pipe 3 is sufficiently large to slow down sufficiently the velocity of the oils entering the tank, the adsorbent and metal compound will completely settle from the oils before the oils are discharged through the pipe 12. The numeral 14 indicates valves for suitably controlling the flow in the various pipes. A pipe 15 also connects with the discharge from the centrifugal pump 1, the purpose of said pipe 15 being to enable the system or apparatus to be emptied.

In operation the sour oil to be treated enters from the pipe 4 into the pipe 6 where it is mixed with air entering the pipe 6 from the pipe 9.

Where an acid is to be used, the same may be introduced through the pipe 10. The metal compound or mixture of metal compound and absorbent clay enters the pipe 6 from the hopper 7 by means of the pipe 8. In this description of the operation, a mixture of 95% clay and 5% solid cupric chloride is taken as illustrative of the reagents employed. The sour oil, substantially free of undissolved water (that is without admixture with water), and preferably dried by passage over rock salt (NaCl) or calcium chloride, is intimately mixed with the air and clay-cupric chloride mixture in the centrifugal pump 1 and the mixture is discharged through the pipe 3 into the tank 2 where the clay-cupric chloride mixture settles from the oil in the conical portion of the tank 2. The settled clay-cupric chloride mixture with some oil is then redrawn into the pipe 6 through the pipe 5 under the action of the pump for treating further quantities of sour oil.

The treated or sweet oil is withdrawn from the tank 2 by means of the pipe 12, and, if necessary, passed through a strainer 13 to remove suspended matter. When air is introduced through the pipe 9, nitrogen will also escape with the oil passing out through pipe 12.

For a naphtha containing 44 milligrams mercaptans per 100 cubic centimeters of naphtha and containing 0.060% total sulphur and 5.0 milligrams gums (by copper dish method) per 100 cubic centimeters oil, it has been found that 25 barrels of such an oil may be circulated in the apparatus shown with 125 pounds of a clay mixture containing 95% clay and 5% cupric chloride and the sweetened oil withdrawn through pipe 12. The sweetening is substantially fully accomplished after the mixture of oil and reagents has passed through the centrifugal pump 1.

As the oil to be treated enters the circulating body of oil and reagents from the pipe 4, the treated oil is withdrawn through the pipe 12. The clay-cupric chloride mixture is thus continually re-circulated with oil to be treated.

The clay-cupric chloride mixture seems to be utilizable in the form of apparatus shown in Figure 1, as long as it is practically possible to circulate it with the oil under treatment. The conversion of the mercaptans into doctor sweet products is accompanied by the formation of very small amounts of water which appears to be taken up by the clay mixture together with water or moisture associated with the air, dry hydrochloric acid, or oil fed into the apparatus as described. It has been found that when the moisture content of the clay mixture reaches about 10 to 14 per cent, small spherical pellets are formed in the apparatus shown in Figure 1, the said pellets then being considerably smaller than mustard seed. The air, oxygen, or oxygen containing gas, which is used to regenerate or reactivate the metal compounds or mixtures used to sweeten the sour oils, also acts to considerably retard the formation of these pellets. The air or oxygen or oxygen containing gas also prevents certain objectionable colorations from occurring in the oils treated which would otherwise be the case if oxygen were not used. This is especially true where cupric salts or mixtures of cupric salts and adsorbents are employed, for example a mixture of 95% clay and 5% cupric chloride. The adsorbents used, such as fuller's earth or clay, also assist in preventing these objectionable colorations.

Before the above described stage of pellet formation is reached, for example when the moisture or water content of the clay is about 9 per cent, the settled clay mixture in the tank 2 may be withdrawn by pumping it out through the pipe 15, and the so withdrawn clay mixture, which is in the form of a slurry with oil, is subjected to a drying operation in order to reduce the moisture or water content, whereupon the clay mixture may be used again for treating further quantities of oil until the water concentration builds up again to an objectionable degree, after which the clay mixture may be again freed of moisture or water by drying and used over again.

The drying of the clay mixture slurry may be accomplished by spreading the slurry out in thin layers and permitting the oil and moisture to evaporate, either with or without the application of heat. When treating raffinates, the slurry of raffinate and clay mixture is advantageously dried by distillation under reduced pressure at a temperature preferably not exceeding 200° F. The vacuum employed with this temperature is about 28 inches or an absolute pressure of 1.92 inches. Heat and vacuum may be similarly applied to dry the clay mixtures when used to sweeten other oils besides raffinates.

Instead of agitating the sour oils to be treated with the various reagents employed as in the use of the apparatus shown in Figure 1, the contact between the reagents and the sour oil may be accomplished by passing the oil and an oxygen containing gas through one or more stationary beds of solid reagents or mixtures, as illustrated in Figure 2.

Referring to the form of apparatus shown in Figure 2 of the drawings which can be advantageously used in practicing the invention and utilizing cupric chloride and fuller's earth as examples of the metal compound and adsorbent material used therein, the numeral 26 indicates a drum containing a mass 27 of rock salt (NaCl) or other drying agent, such as solid calcium chloride, for extracting water moisture from the sour oils to be sweetened or treated. These drying agents 27 are supported within the drum 26 by means of a grid, screen or perforated plate 28 which extends across the drum 26 near the lower end but above the inlet pipe 29 for the sour oils to be sweetened. Prior to introduction into the drying drum 26, the sour oil or oils preferably are freed of hydrogen sulphide as by intimate contact with a water solution of sodium hydroxide or other agent. Also prior to introduction of the sour oil into the drum 26, it is advantageous to let as much water as possible settle from the oil by gravity, so as to avoid unnecessary burden on the drying agents 27, and to increase the general efficiency of the process. The sour oils rise through said drying drum 26 and come in intimate contact, in their passage through said drum, with the rock salt, or other drying agent, contained in said drum. The dried, hydrogen sulphide free, sour oils pass out of said drum by means of a pipe 30 which leads to the lower part of the treating chamber or container 31. The lower end of the drying drum 26 is provided with an outlet 32 controlled by a valve 33 for exhausting accumulated water or salt solution from the drum 26.

A steam actuated pump designated generally by the numeral 34, and supplied with steam from a steam line 35, removes from the pipe 30 a portion of the sour oil flowing therein. This removal of oil from the pipe 30 is accomplished through a pipe 36 connected between the pipe 30 and the pumping chamber of the pump 34. The portion of the oil thus removed by the pump 34 is delivered by the pump through the pipe 37 to the ejector 38, into which ejector leads a valve controlled pipe 39 for the introduction of regulated amounts of dry oxygen, or air, or a dry gas rich in oxygen, into the ejector for incorporation into the oil passing through said ejector. The introduction of the regulated amounts of oxygen may be continuous or intermittent. The oil and oxygen leaving the ejector 38 pass, in the form of a mixture of oil and oxygen, into the pipe 40 and then into the pipe 30, where the mixture of oil and oxygen delivered by the pipe 40 mixes with the main body of sour oil flowing in the pipe 30. The pipe 40, as shown, connects with the pipe 30 at a point nearer the treating chamber 31 than the point of connection of the pipe 36 with the pipe 30. In the steam line 35, is indicated generally by the numeral 41 a governor for the pump.

A section 42 of the pipe 30, between the point where the pipe 40 connects with the pipe 30 and the treating chamber 31, is occupied advantageously by an orifice mixer, or other suitable mixer, for intimately mixing the oil and oxygen or air before it passes through the remaining portion 43 of the pipe 30 and enters the lower part of the treating chamber 31.

The treating chamber 31 is provided with an outlet 44 for the sweetened oil at the top of said chamber, and a drain outlet 45, controlled by the valve 46, at the bottom of said treating chamber. In normal operation, the valve 46 is closed. The outlet 44 is connected with a coupling 47, one branch of which is connected with the pipe 48 for conducting the sweetened oil to storage and another branch of which is connected with the safety valve 49. A grid, screen, perforated plate or porous earthen or refractory plate 50 extends across the chamber 31 nearer the lower end than the top and above the inlet for the oil for supporting the metal compound and adsorbent material 51 within the chamber.

The cupric chloride and fuller's earth, used as specific examples of metal compound and adsorbent material, in describing the apparatus shown in Figure 2 and its operation, may be disposed within the chamber 31 in different ways. For example: (1) A more or less intimate mixture of solid cupric chloride and fuller's earth may be previously formed and introduced into the chamber 31 and distributed as a more or less uniform layer above the supporting member 50; (2) the solid cupric chloride and fuller's earth may be introduced into the chamber 31 separately and more or less simultaneously, for example by introducing solid cupric chloride and fuller's earth separately and simultaneously in the desired proportions into the chamber 31 until the desired amount of both is introduced, the mixing occurring thereby being sufficient, whereupon the cupric chloride and fuller's earth are distributed as a layer uniformly over the supporting member 50; (3) a layer of fuller's earth may be placed over the member 50 and over this layer of fuller's earth is placed a layer of cupric chloride and over this layer of cupric chloride is placed another layer of fuller's earth; (4) a layer of cupric chloride may be placed upon the supporting member 50 and a layer of fuller's earth placed on the layer of cupric chloride; (5) a layer of a mixture of cupric chloride and fuller's earth may be placed upon the member 50 and a layer of fuller's earth placed over it; (6) several layers of solid cupric chloride and fuller's earth may be used alternating with each other; (7) a layer of fuller's earth may be placed upon the supporting member 50 and upon this layer is placed a layer of solid cupric chloride or a layer of a mixture of solid cupric chloride and fuller's earth, and over these layers another layer of fuller's earth followed by another layer of solid cupric chloride or a mixture of solid cupric chloride and fuller's earth. In all of these and in other arrangements of materials it is advantageous to have an uppermost layer either of fuller's earth, or other suitable absorbent, or a mixture of fuller's earth (or other adsorbent) and cupric chloride. The necessary thickness of the layers of reagents upon the supporting member 50 may be readily ascertained by trial and ordinarily no trouble is experienced in this regard. The rule to follow in regard to the amount of reagents and thickness of layers of reagents is that sufficient reagents and sufficient thickness of layers must be employed so that the oils passing out of the chamber 31 through the pipe 48 shall be sweet, or sweet to the desired extent and substantially free from organic sulphur metal compounds or metal compound decomposition products thereof, for example, respectively copper mercaptide and cuprous oxide where the metal compound used is cupric chloride.

The operation of the process when practiced in the apparatus shown in Figure 2 is readily understood from the above description of that figure. The sour oil, freed of hydrogen sulphide enters the drying drum 26 by means of the pipe 29, passes through the drying drum into the pipe 30 which leads into the treating chamber 31. While the main body of the sour oil is proceeding to the treating chamber 31, a portion of the sour oil is removed from the main stream through the pipe 36 and is then mixed with oxygen in the ejector 38 and re-inserted into the main body of the oil flowing in pipe 30, where intimate mixture of the oil and oxygen occurs before the mixture is introduced into the treating chamber 31. The oil and admixed oxygen then pass through and in contact with the cupric chloride and fuller's earth, and the sweetened oil passes out of the chamber 31 by means of the pipes 44 and 48. The sour oil entering the pipe 29 is preferably forced as a continuous rapid stream through the apparatus, and is withdrawn as sweetened oil through the pipe 48 as fast as sour oil enters the pipe 29. The sour oil mixed with the oxygen, therefore, is caused to pass rapidly through the body of reagents 51 within the treating chamber 31.

When the process is practiced in the apparatus shown in Figure 2, the formation of the pellets, encountered in the practice of the process in the apparatus shown in Figure 1, does not occur. Due in part to this fact and to the employment of a stationary bed of solid reagents, the latter are highly effective for removing the constituents imparting sourness to these oils, even when the solid reagents have moisture contents as high as 20 or 25% of their own weight, under the conditions heretofore described. Solid reagents containing around 15% of moisture have been used continuously for the sweetening of over one and a half millions of barrels of sour pressure distillate in accordance with the present invention, without measurable decrease in the efficiency of the said reagents.

Another feature of the present invention consists in the use of regulated small amounts of oxygen-containing gas (preferably pure oxygen or oxygen-enriched air) in the process and apparatus above described. By regulating the amount of oxygen entering the pipe 6 through the pipe 9 of Figure 1, or by regulating the amount of oxygen entering the ejector 38 through the pipe 39 of Figure 2, it has been found that relatively small quantities of oxygen will sweeten the sour oils and concurrently maintain the activity of the solid reagents. Since these relatively small amounts of oxygen are added to the oils undergoing treatment, and since preferably the treatment of the oils is conducted at or not greatly above atmospheric temperatures, there is little, if any, oxidation and destruction of unsaturated hydrocarbons contained in the oil. Therefore, the use of only so much oxygen as is necessary to accomplish the sweetening of the oil and to maintain the activity of the solid reagents results in sweet oil having a lower content of gums or gum forming substances than such oil would have if the oxygen had been indiscriminately used or used in excessive amounts. The regulation of the amount of oxygen entering the apparatus shown in Figures 1 and 2 may be accomplished by any suitable valves or gas regulating means applied to the pipes 9 and 39.

In the above described processes of treating mineral oils, finely divided kieselguhr, pumice, calcium silicate, porous earthenware, and sand may be substituted in whole or in part for the clays and other adsorbent materials above described. Other adsorbents such as active (or activated) carbon or silica gel may be substituted in whole or in part for the adsorbent or adsorbent clays or alumina or activated alumina heretofore mentioned, and all of these adsorbent materials are utilizable in about the same proportions.

The gasoline or other oils containing mercaptans or other organic sour constituents are sweetened by treatment according to the present process. The mercaptans which are the principal sour constituents are changed into organic disulphides of the type R—S—S—R in the sweet gasoline. As a result of this conversion of mercaptans into disulphides, acid (as hydrochloric acid when using cupric chloride) appears to arise which would otherwise be found present in the treated gasoline or other oil were it not for the presence of the adsorbent which appears to retain the acid and prevents it from contaminating the sweetened material. The clay has the further action of retaining the acid so that it may be present in contact or in association with the metal compound so that the oxygen or air used to accomplish the regeneration may better accomplish its function. The organic disulphides arise because of the oxidation of the mercaptans in the sour oils to disulphides and water, which small amount of water either remains in solution in the oil treated or is taken up by the clay. This oxidation action, where polyvalent metal compounds are employed, is accompanied by a reduction in the valency or degree of oxidation of the metal, which is restored again to a higher valency or maintained in a higher valency or state of oxidation by the air or oxygen which is introduced into the apparatus. The chemical actions taking place in the process utilizing a metal compound, an adsorbent and oxygen, air or other equivalent oxidizing agent will more fully appear from the following explanations, using cupric chloride, fuller's earth and oxygen, respectively as the metal compound, adsorbent and oxidizing agent: the cupric chloride reacts with the sour constituents (the mercaptans) and forms therewith copper mercaptides (organic sulphur metal compounds) and becomes spent to the extent that it has reacted with the sour constituents: these mercaptides (organic sulphur metal compounds) are removed from the oil, or caused to disappear therefrom by the action of the fuller's earth (the adsorbent material), and the oxygen which is added over and above any naturally occluded in the fuller's earth (adsorbent material) maintains, renews or continues the activity of the cupric chloride( metal compound) to sweeten the sour oil, that is to say regenerates what is spent, as well as continues or maintains the activity of the fuller's earth (adsorbent material) to remove or cause the disappearance of mercaptides (organic sulphur metal compounds). The net result of the actions may, therefore, be considered as carrying of oxygen to the mercaptans or sour constituents to oxidize them.

The amount of air or oxygen progressively introduced into the apparatus must be sufficient to accomplish the regeneration of the reagents employed. Roughly it might be said that the quantity required must be sufficient to keep the metal compounds used in their higher valency conditions. An excess of air or oxygen appears to be without harmful influence on the treatments of the oils, except that excesses of air or oxygen promote the formation of gums in oils containing unsaturated hydrocarbons. For example, in the case of cupric chloride enough air or oxygen must be used to keep the cupric chloride in the cupric condition. It is generally preferable in the practice of the invention, where oxygen is used as the oxidizing agent, to employ .01 cubic foot of oxygen per barrel of 42 gallons of hydrocarbon distillate for each milligram of mercaptan sulphur present in each 100 c. c. of the distillate. However, in instances where the oil or distillate has been given the usual sulphuric acid treatment prior to the present sweetening process, two or more times this amount of oxygen may be employed without detrimental results; and like excesses of oxygen may be employed when treating straight run distillates without forming objectionable amounts of gums or gum forming compounds. When, however, considerably larger percentages of oxygen, or the equivalent of oxygen containing gas, are employed in the process in treating oils containing unsaturated hydrocarbons, gum formation occurs and substantial amounts of valuable hydrocarbons are lost. When dry hydrochloric acid gas is used, it is used in sufficient quantity to make up any loss of hydrochloric acid from the cupric chloride. In the specific examples given above, the hydrochloric acid gas added may amount to about 0.01 cubic foot dry hydrochloric acid gas per barrel of oil treated, although the amount of acid may exceed this amount. The excess of acid seems to be taken up by the adsorbent used, permitting the treated oils to pass out of the apparatus shown free of hydrochloric acid. An excess of hydrochloric acid is not harmful, but on the contrary is beneficial, improving the color and color stability of the sweetened oil.

In cases where the oil or material to be treated contains considerable amounts of hydrogen sulphide in addition to the mercaptans, it is preferable to intimately contact the material with an aqueous caustic soda solution, or any other suitable agent, for the purpose of removing the hydrogen sulphide. In the case of treating naphthas, gasolines or kerosenes etc., as now prepared by refineries, it is not usually necessary to employ this caustic alkali treatment as a preliminary step to the process of the present invention, for the reason that the naphtha, gasoline or kerosene etc., is usually, during its preparation or manufacture by the refineries, intimately contacted with a water solution of sodium hydroxide which would remove hydrogen sulphide and compounds of a kindred nature.

The hydrocarbon oils are treated according to the present invention in liquid phase, the treatment being advantageously performed at atmospheric temperatures, at which temperatures the reagents (such as cupric chloride etc.) would normally react with mercaptans to form mercaptides and which temperatures are below the point at which mercaptides would be decomposed by heat; although it is to be understood that the present invention also applies to oils which may be heated to a point considerably above ordinary atmospheric temperatures but below their boiling points. The oils also may be treated under pressure either at atmospheric temperatures or higher temperatures indicated above. It is a well known fact that hydrocarbon or mineral oils and distillates thereof are usually stored or collected in large tanks in the open and subject to all changes in atmospheric temperatures, and the terms "atmospheric temperatures" or "atmospheric temperature" as used herein are intended to include temperatures within the range of temperatures to which such oils and distillates may be subjected while contained in tanks exposed to the atmosphere.

The invention may be applied to the treatment of pressure distillates, distillates resulting from the cracking of petroleum oils, or to the treatment of straight run distillates from petroleum oils, all of which I include in the term "hydrocarbon oil".

The oils to be treated should be substantially free of undissolved water when treated in accordance with the present invention, that is to say, the action of the metal compounds, adsorbent material, added oxygen and acid on the oils should take place substantially in the absence of water. If the oil before treatment in accordance with the present invention has been washed with water or treated with any aqueous solution, the water or aqueous solution should be allowed to completely settle from the oil, and the oil only when separated from water or aqueous solution used for practicing the invention. Preferably the sour oils to be sweetened should be dried by passing them over or in contact with drying agents as heretofore described. Small amounts of water within the limits explained in preceding paragraphs of this description are not objectionable, nor does any water which may be dissolved in the oil treated impair the operation of the process. The terms used in the appended claims are intended to cover and describe the processes defined therein when practiced with water moisture contents in the oils and reagents employed ranging from zero per cent to the limits given in this and preceding paragraphs of this description.

Instead of utilizing the metal compounds such as cupric oxide, cupric hydroxide, cupric chloride, cupric nitrate, basic cupric carbonate, mercuric chloride, ferric chloride, ferric sulphate etc., in the higher valency in the beginning of the treatment of the oils to sweeten them, these compounds may be employed in the beginning in the lower valencies or in the -ous condition and brought up to the higher valency or -ic condition during the practice of the invention through the oxidizing action of the oxidizing agent introduced into the oil undergoing treatment or through the oxidizing agents added to the metal compounds or mixtures of metal compounds and adsorbents.

While the sweetening agents employed are preferably regenerated or reactivated or maintained in the active condition concurrently with the sweetening action, it is to be understood that the sweetening agents or mixtures described herein may be regenerated or reactivated as a separate step. For example, referring to Figure 1 of the drawings, the sour oils may first be treated with the sweetening reagents or mixtures of sweetening reagents and adsorbent material and after they have become partially or wholly spent, the slurry of oil and the sweetening agents or the slurry of oil with the mixtures of sweetening agents and absorbent material may be circulated in the apparatus shown in the drawings by means of the centrifugal pump while oxygen or air is added thereto through the pipe 9 with or without the introduction of hydrochloric acid through the pipe 10. Or the slurry of oil with the partially or wholly spent metal compounds or mixtures of metal compounds and clay may be withdrawn from the tank 2 and placed in another container and the said slurry intimately contacted with air or oxygen with or without the intimate admixture thereto of hydrochloric acid. It is, however, most advantageous to reactivate or maintain the activity of the sweetening agents or materials concurrently with the sweetening operation, because it has been found that the rate of regeneration or maintenance of the activity of the sweetening agents is at least as fast as the rate of the sweetening action, that is, that the rate of regeneration, or maintenance of the activity, of the metal compounds or mixtures of metal compounds and clay does not lag behind the rate of sweetening of the sour constituents, as appears to be the case where large quantities of water are present, and furthermore, the added oxygen, as pointed out above, retards the formation of pellets and also prevents objectionable colorations being produced in the oils treated by the reagents employed.

Instead of passing the air or oxygen into contact with the metal compound and adsorbent while the sour oil is being treated as shown in Figure 2, the flow of the oil may be discontinued and air or oxygen blown or aspirated through the metal compound and adsorbent to regenerate them; or regeneration of the metal compound and adsorbent may be accomplished by removing them from the apparatus and exposing them to the air, while spread out in thin layers, for a sufficient time to produce regeneration of them, whereupon they may be used over again to sweeten sour oil.

When using the form of apparatus shown in Figure 1, the metal compounds or mixtures of metal compounds and adsorbent need not be continuously introduced into the apparatus. A batch of metal compound or a mixture of metal compound and adsorbent is introduced into the pipe 6 from the hopper 7 by passage through the pipe 8, under the influence of the centrifugal pump 1, and after the introduction of the batch the valve 14 in the pipe 8 is closed. The batch so introduced is maintained in continuous circulation in the apparatus in the manner described above in practicing the process. When using the apparatus shown in Figure 2, a single batch of metal compound and adsorbent introduced into chamber 31 suffices for treating very large volumes of oil.

The process of the present invention is usually applied, especially in the case of light distillates, such as gasoline, naphthas and kerosene and the like, as the final step in the refining of hydrocarbon oils. Such oils, upon issuing through the pipe 12 of Figure 1 and the pipe 48 of Figure 2 are ready for use and sale, with the possible exception of the addition of a suitable inhibitor to retard or prevent the formation of gums during periods of long storage of the products sweetened. It is not necessary to subject the oils after they have been sweetened according to the present invention to washing with aqueous solutions of sodium hydroxide or sodium carbonate or other alkaline agent, nor is it necessary to revaporize or re-distil the sweetened oils for preparing them for final use, as they may be used and marketed substantially as they leave the treaters shown in the drawings.

As indicated above the process in substance converts the sour constituents of the oils or mercaptans into disulphides by oxidation. The materials used as treating agents act in substance as carriers for oxygen to the mercaptans, oxidizing them to disulphides, that is to say as promoters of oxidation of the mercaptans. While I have enumerated a number of metal compounds which may be used, it is to be understood that I do not limit myself to the compounds or agents specifically enumerated, as others are within the scope and principle of my invention. A substantially dry mixture of lead oxide (litharge), sodium hydroxide and adsorbent, for example, fuller's earth, if intimately mixed or contacted with sour gasoline or oil with intimate admixture with the oil of oxygen or air, will sweeten sour oils and the presence or addition of air or oxygen will maintain the sweetening activity of the mixture of lead oxide, sodium hydroxide and adsorbent. In this last mentioned instance, the substantially dry mixture of lead oxide, sodium hydroxide and adsorbent may be employed in substantially the same way to sweeten the sour oils as the clay-cupric chloride mixture described above, except that no hydrochloric acid is employed, and no sulphur is required to be added to the oils as is usual in employing sodium plumbite. The litharge and sodium hydroxide may be employed about in the proportions that would form sodium plumbite and the fuller's earth may be varied between wide limits, for example the fuller's earth may form from 40% to 95% of the mixture. In this latter example of reagents it may become necessary to have a small amount of water moisture present to initiate the chemical actions, but water moisture should not be present to such an extent that the reagents acquire a muddy or plastic condition. Thus, I do not limit the practice or scope of the invention to any particular agent or mixtures but the invention includes the use of all agents or mixtures operating within the principle of the invention, whether or not the agents contain components capable of existing in different degrees of oxidation or valencies.

The terms "oxygen" and "gaseous oxygen" in the appended claims are intended to include, wherever the context permits, oxygen in pure or impure condition, and oxygen gas in admixture with other gases, for example air, which is a mixture comprising oxygen and nitrogen.

By the terms "dry", "substantially dry", "non-aqueous" and similar expressions occurring in the specification and claims, I intend to designate solid treating agents and mixtures of treating agents which may contain the natural water content of the solid adsorbent and/or any normal water of crystallization of the inorganic salts employed, and water incidentally formed in the process or taken up from the oil being treated, but wherein the moisture content of the said treating agents or mixtures is not sufficient to cause the formation of an independent aqueous solution phase separable or flowable as such from the adsorbent material, or to cause the formation of an aqueous muddy mass with the clay or other adsorbent, as indicated above in the specification.

Due to the dehydrating effect of cracked gasolines which previously have been washed with caustic soda (NaOH) solution and contacted thereafter with solid sodium chloride or solid calcium chloride, it may become necessary, in practicing the present invention, to add to or mix into the oils entering the tank 2 or chamber 31, a small or controlled amount of water moisture to accelerate the sweetening action or to promote the chemical actions occurring in said tank or chamber; but water limits should be maintained as heretofore explained.

In treating gasolines according to the present invention it has been found advantageous, in some instances, to subject them to a preliminary treatment with aqueous solutions of sulphuric acid, hydrochloric acid or ferric chloride for the purpose of removing from said gasolines nitrogen base compounds and other constituents or impurities in the gasoline which appear to exercise a retarding influence upon the action of the sweetening agents used in the present invention.

For this purpose one per cent water solutions of hydrochloric acid or sulphuric acid, or ten per cent water solution of ferric chloride, may be employed. The hydrochloric acid, sulphuric acid or ferric chloride solution is intimately mixed or agitated with gasoline, whereupon the gasoline is separated from the aqueous solution, and the so treated and separated gasoline then treated according to the present invention. When such pretreatment is applied to raw pressure distillates and said so treated pressure distillates sweetened according to the present invention, the resulting sweetened gasoline has a better induction period and exhibits a better gum test than such gasolines would exhibit if treated according to the present invention without such pretreatment.

The present application is a continuation in part of my copending applications which have issued into Patents No. 2,042,054, May 26, 1936; No. 2,042,052, May 26, 1936; and No. 2,042,051, May 26, 1936.

I claim:

1. The process of treating sour hydrocarbon oil to sweeten same which comprises contacting said oil, in the presence of added oxidizing agent, with a substantially non-aqueous mixture comprising an adsorbent material and a compound of copper which forms mercaptides with mercaptans, said oxidizing agent having the property of prolonging the activity of said mixture and being in addition to any oxygen initially occluded in the adsorbent material.

2. The process of treating sour hydrocarbon oil to sweeten same which comprises contacting sour hydrocarbon oil, substantially in the absence of water, with cupric chloride in the presence of gaseous oxygen.

3. The process of treating sour hydrocarbon oil to sweeten same which comprises contacting sour hydrocarbon oil, substantially in the absence of water, with a substantially non-aqueous mixture comprising an adsorbent material and cupric chloride, and performing said contacting in the presence of an oxidizing agent which prolongs the activity of said mixture, said oxidizing agent being in addition to any oxygen initially occluded in the adsorbent material.

4. The process of treating sour hydrocarbon oil to sweeten same which comprises contacting sour hydrocarbon oil, substantially in the absence of water, with a substantially non-aqueous mixture comprising cupric chloride and an adsorbent material, and performing said contacting in the presence of a mineral acid and oxygen other than any oxygen which may be initially occluded in said adsorbent material.

5. The process of treating sour hydrocarbon oil to remove sourness which comprises contacting said oil, in the presence of gaseous oxygen added thereto, with a substantially dry mixture comprising an adsorbent material and a salt of copper which forms mercaptides with mercaptans.

6. The process of treating sour hydrocarbon oil to remove sourness which comprises contacting said oil, in the presence of gaseous oxygen added thereto, with a substantially dry mixture comprising a chloride of copper and an adsorbent material.

7. The process of treating sour hydrocarbon oil to remove sourness which comprises contacting said oil, at substantially an atmospheric temperature, in the presence of gaseous oxygen added thereto, with a substantially dry mixture comprising an adsorbent material and a compound of copper which reacts with mercaptans to form mercaptides.

8. The process of treating sour hydrocarbon oil to remove sourness which comprises contacting said oil, at substantially an atmospheric temperature, in the presence of gaseous oxygen added thereto, with a substantially dry mixture comprising an adsorbent material and a salt of copper which reacts with mercaptans to form mercaptides.

9. The process of treating sour hydrocarbon oil to remove sourness which comprises contacting said oil, at substantially an atmospheric temperature, in the presence of gaseous oxygen added thereto, with a substantially dry mixture comprising a chloride of copper and an adsorbent material.

10. The process of treating sour hydrocarbon oil to remove sourness which comprises contacting said sour oil, at a temperature below the point at which mercaptides are decomposed by heat, with a substantially dry mixture comprising an adsorbent material and a compound of copper which reacts with mercaptans to form mercaptides, contacting said mixture with gaseous oxygen to revivify it, and contacting further quantities of sour hydrocarbon oil with said revivified mixture to sweeten said oil.

11. The process of treating sour hydrocarbon oil to sweeten same, which comprises subjecting said sour oil, incorporated with gaseous oxygen, to the action of (1) a solid salt of a metal which reacts with sour constituents in the oil to form organic sulphur metal compounds, and which is mantained active in the presence of the said gaseous oxygen, and (2) an adsorbent material.

12. The process of sweetening a sour hydrocarbon oil which comprises contacting said oil, at substantially an atmospheric temperature, and substantially in the absence of water, with a mixture comprising an adsorbent material and a salt of a metal exhibiting variable valency which reacts with mercaptans to form mercaptides, and adding to the oil undergoing contact with said mixture, at least at intervals, an oxidizing agent which continues the sweetening power of said mixture.

13. The process of sweetening a sour hydrocarbon oil which comprises contacting said oil at substantially an atmospheric temperature, and substantially in the absence of water, with a mixture comprising an adsorbent material and a salt of a metal exhibiting variable valency forming mercaptides with mercaptans, and subjecting said mixture to the action of an oxidizing agent which regenerates said mixture, and contacting further quantities of sour oil with the regenerated mixture.

14. In the treatment of sour hydrocarbon oil which has been previously treated to remove water therefrom, the process which comprises incorporating an oxygen containing gas in the said sour oil, and subjecting the resultant mixture to the action of (1) a solid salt of a metal which reacts with sour constituents in the oil to form organic sulphur metal compounds, and which is maintained active in the presence of oxygen, and (2) an adsorbent material.

15. The process of treating sour hydrocarbon oil to sweeten same which comprises contacting said oil, substantially in the absence of water, and at substantially an atmospheric temperature, with a mixture comprising an adsorbent material and a salt forming with sour constituents in said oil organic sulphur metal compounds removable from said oil by the adsorbent material, and conducting said contacting in the presence of an added oxidizing agent which imparts renewed activity to said mixture for sweetening further quantities of sour oil, said added oxidizing agent being in addition to any oxygen occluded in said adsorbent material originally.

16. The process of treating sour hydrocarbon oil to sweeten same which comprises contacting said oil, substantially in the absence of water, with a mixture comprising an adsorbent material and a salt forming with sour constituents in said oil organic sulphur metal compounds removable from said oil by the adsorbent material, and, at least during a part of the time of said contacting adding to the oil undergoing treatment an oxidizing agent which revivifies the activity of said mixture to sweeten further quantities of sour oil, said oxidizing agent being in addition to any oxygen which may be occluded in said adsorbent material at the beginning of the treatment.

17. In the treatment of sour hydrocarbon oil which previously has been treated to remove hydrogen sulphide and water therefrom, the process which comprises incorporating in the said sour oil gaseous oxygen, and subjecting the resultant mixture to the action of (1) a solid salt of a metal which reacts with sour constituents in the oil to form organic sulphur metal compounds, and which is maintained active in the presence of the said oxygen, and (2) an adsorbent material.

18. The process of treating a sour hydrocarbon oil to decompose mercaptans contained therein which comprises reacting upon mercaptans contained in said sour oil with a salt to form mercaptides, forming said mercaptides in the presence of an adsorbent material substantially free of water, so that said mercaptides can come into contact with said adsorbent material, and after said contact subjecting said adsorbent material to the action of oxygen, and thereafter contacting further quantities of sour oil with the said so treated adsorbent material to sweeten said sour oil.

19. The process of treating a sour hydrocarbon oil to decompose mercaptans contained therein which comprises contacting said oil with a substantially dry mixture comprising an adsorbent material and a salt of a metal which forms mercaptides with the said mercaptans, said contacting being performed at a temperature below the point at which mercaptides are decomposed by heat, and contacting said mixture with oxygen to continue its power to decompose mercaptans, and contacting further quantities of sour oil with said so treated mixture.

20. The process of treating sour hydrocarbon or mineral oil to sweeten same which comprises contacting said oil with a dry mixture comprising an adsorbent material and a salt which reacts with sour constituents in the oil and sweetens the oil in the presence of said adsorbent material, said salt having also the property of being regenerated for repeated used in said mixture upon being contacted in said mixture with elemental oxygen, the said contact with said mixture being performed at a temperature below the point at which mercaptides are decomposed by heat, subjecting the said mixture after use in sweetening sour oil to the action of an oxidizing agent which regenerates the sweetening powers of said mixture, and contacting further quantities of sour oil with said so regenerated mixture to sweeten same.

21. The process of treating sour hydrocarbon oil to sweeten same which comprises contacting said oil with a dry mixture comprising adsorbent material and a salt which reacts with sour constituents in the oil and sweetens the oil in the presence of said adsorbent material, said salt having also the property of being maintained in activity for repeated use in said mixture for sweetening sour oil upon being contacted in said mixture with elemental oxygen, and adding to the oil undergoing contact with said mixture, at least during a portion of the time the oil is undergoing contact therewith, an oxidizing agent which maintains the sweetening activity of said mixture.

22. The process of treating sour hydrocarbon oil to remove sour constituents, which comprises removing hydrogen sulphide from said sour oil, contacting the thus treated oil with dry treating agents comprising a compound of a metal forming organic sulphur metal compounds with substances in the oil imparting sourness thereto, and which metal compound is maintained active in the presence of oxygen, and an adsorbent material, the said contacting step being conducted in the presence of an added gaseous oxidizing agent which maintains the sweetening activity of the said agents.

23. In the treatment of sour hydrocarbon oil for sweetening the same, which oil has been treated to remove water, the process which comprises contacting the thus treated oil with a compound of a metal forming organic sulphur metal compounds with substances in the oil imparting sourness thereto, and which metal compound is maintained active in the presence of oxygen, and with an adsorbent material, the said contacting step being conducted in the presence of an added gaseous oxidizing agent which maintains the sweetening activity of the said treating agents.

24. In the treatment of sour hydrocarbon oil to remove sourness, which oil previously has been treated to remove water therefrom, the process which comprises contacting the thus treated oil with a substantially dry mixture comprising an adsorbent material and a compound of a metal forming organic sulphur metal compounds with compounds in the oil imparting sourness thereto and which is maintained active in the presence of oxygen, the said contacting step being conducted in the presence of added oxygen which maintains the sweetening activity of said mixture.

25. A process according to claim 21 in which the oil is contacted with the mixture defined in said claim in the presence of added mineral acid.

26. The process of sweetening sour hydrocarbon oil which comprises adding gaseous oxygen to said sour oil, thereafter contacting said oil with a body of an agent which forms mercaptides with sour constituents in the oil, and thereafter contacting said oil with adsorbent material to remove mercaptides from said oil.

27. Process for sweetening mercaptan-bearing hydrocarbon oil, which comprises adding to said oil a small controlled amount of water moisture and a gas containing free oxygen, and contacting the resultant mixture with (1) a salt of a metal which reacts with mercaptans in the presence of free oxygen to form mercaptides and which salt is maintained active in the presence of oxygen, and (2) an adsorbent material.

28. Process for sweetening a sour hydrocarbon oil that has dehydrating properties, which comprises contacting said oil containing free oxygen with a sweetening agent comprising an adsorbent material and cupric chloride, and introducing controlled amounts of water moisture into the oil flowing to the sweetening agent, thereby counteracting the dehydrating effect of said hydrocarbon oil upon said mixture and accelerating sweetening of the oil.

29. Process for sweetening mercaptan-bearing hydrocarbon oil to sweeten the same, which comprises adding to said oil an oxygen-containing gas and a controlled amount of moisture, and contacting the resultant mixture with a treating agent comprising an adsorbent material and a copper compound forming mercaptides with mercaptans.

30. Process as defined in claim 29, wherein said copper compound is cupric chloride.

CHARLES O. HOOVER.